US011157308B2

(12) United States Patent
Le Toquin et al.

(10) Patent No.: US 11,157,308 B2
(45) Date of Patent: Oct. 26, 2021

(54) FUNCTION CALL SEQUENCE PROCESSING

(71) Applicant: Amadeus S.A.S., Biot (FR)

(72) Inventors: Youri Thibault Marie Le Toquin, Nice (FR); Luc Isnardy, Cagnes sur Mer (FR); Frederic Lobello, Roquefort les Pins (FR); Brigitte Elisabeth Ruscica, Grasse (FR); Stefano Lori, Antibes (FR)

(73) Assignee: AMADEUS S.A.S., Biot (FR)

( * ) Notice: Subject to any disclaimer, the term of this patent is extended or adjusted under 35 U.S.C. 154(b) by 144 days.

(21) Appl. No.: 16/571,815

(22) Filed: Sep. 16, 2019

(65) Prior Publication Data

US 2020/0097321 A1 Mar. 26, 2020

(30) Foreign Application Priority Data

Sep. 20, 2018 (FR) ........................................ 1858499

(51) Int. Cl.
*G06F 9/46* (2006.01)
*G06F 9/48* (2006.01)

(52) U.S. Cl.
CPC .................................. *G06F 9/4843* (2013.01)

(58) Field of Classification Search
CPC ..................................................... G06F 9/4843
See application file for complete search history.

(56) References Cited

U.S. PATENT DOCUMENTS 6,009,265 A 12/1999 Huang et al.
7,650,331 B1 1/2010 Dean et al.
2004/0122798 A1 6/2004 Lin et al.
2005/0097078 A1 5/2005 Lohman et al.
2007/0188339 A1* 8/2007 Sukegawa .............. G06Q 10/00 340/691.6
2009/0281986 A1 11/2009 Bestgen et al.
2019/0130456 A1* 5/2019 De La Breteche .... G06N 7/005

FOREIGN PATENT DOCUMENTS

CN 108388666 A 8/2018
EP 2869257 A1 5/2015

OTHER PUBLICATIONS

European Patent Office, Search Report issued in Application No. EP 19 19 8335 dated Oct. 7, 2019.
National Institute of Industrial Property, Preliminary Search Report issued in French Patent Application No. 1858499 dated Apr. 12, 2019.

* cited by examiner

*Primary Examiner* — Camquy Truong
(74) *Attorney, Agent, or Firm* — Thompson Hine LLP

(57) ABSTRACT

Methods, systems and computer program products for processing an input sequence of a plurality of function calls on at least one processor. Each function call of the plurality of function calls is associated with an abort probability, and each function call is also associated with a processing cost per function call on the basis of a number of processor instructions of the respective function call and the abort probability of the respective function calls. During processing of the function calls according to an input sequence, the abort probability for at least some of the function calls may be updated taking into consideration whether or not the processing of the respective function call caused an abort. The processing cost per function may be updated during processing, and an updated input sequence may be determined by rearranging the order of the function calls based on the processing cost.

18 Claims, 10 Drawing Sheets

FUNCTION CALL SEQUENCE PROCESSING

TECHNICAL FIELD

The present invention generally relates to data processing methods and systems. In particular, it relates to processing a sequence of a plurality of function calls.

BACKGROUND

On receiving a request, large-scale data processing systems load thousands of data records from one or more databases, create millions or billions of intermediate results from the loaded data records and finally reduce the number of intermediate results to a number of output results which in general does not exceed a single- or double-digit range. Hence, intermediate results which do not contribute to the set output results are invalidated in the course of data processing.

U.S. Pat. No. 7,650,331 B1 relates to large-scale data processing. Requested data is provided by retrieving input data from data files. Intermediate data values are created from input data provided from a user by map operations. The intermediate data values are then reduced by operations such as merging, combining or filtering the intermediate data in order to obtain output data, which then is provided to the user.

EP 2 869 257 A1 performs an iterative configuration of products starting from a complex product model which is simplified by pre-defining a specific set of scope variables within the product model and thereby reduces the complexity of the product model iteratively in a two staged process.

SUMMARY

A first aspect is directed to a method for processing an input sequence of a plurality of function calls on at least one processor. Each function call of the plurality of function calls is associated with an abort probability, the abort probability of a particular function call indicating a probability that processing the particular function call causes an abort of the processing of the input sequence. Each function call of the plurality of function calls is associated with a processing cost per function call on the basis of a number of processor instructions of the respective function call and/or the abort probability of the respective function call. At least the subset of the plurality of function calls according to the input sequence is processed, at least until a particular function call aborts the processing of the input sequence. The abort probability for at least the subset of the plurality of function calls is updated during the processing of the plurality of function calls, based on whether or not the processing of the respective function call caused an abort. The processing cost per function call for at least the subset of the plurality of function calls is updated during the processing of the plurality of function calls. An updated input sequence is determined by rearranging the order of the function calls at least on the basis of the processing cost of the function calls.

Another aspect relates to a system for processing an input sequence of a plurality of function calls on at least one processor. The system comprises a monitor and an optimizer and at least one processor. The system is arranged to process at least a subset of the plurality of function calls according to the input sequence, according to the method of the first aspect.

Another aspect is directed to a computer program for processing an input sequence of a plurality of function calls on at least one processor, including code instructions stored on a computer-readable storage medium to execute the method according to the first aspect.

BRIEF DESCRIPTION OF DRAWINGS

The present mechanisms will be described with references to accompanying figures. Similar reference numbers generally indicate identical of functionally similar elements.

DETAILED DESCRIPTION

Figure 1:
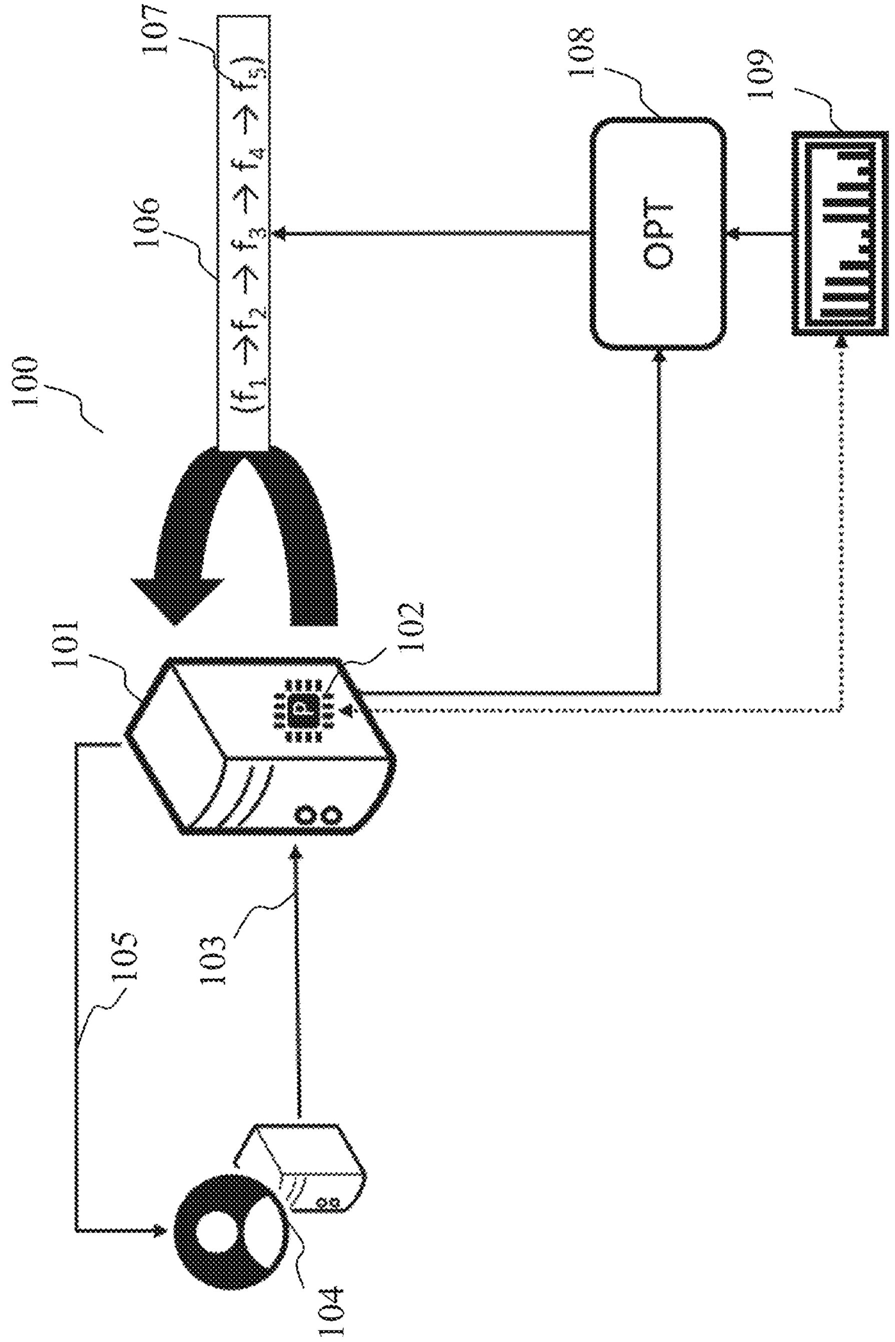
FIG. 1 illustrates a data processing system operating on an input sequence of function calls.

An overview of an exemplary data processing system 100 to process an input sequence 106 of function calls 107 is shown in FIG. 1. The data processing system 100 includes one or more computing machines 101 utilizing one or more processors 102 to process received requests 103 from clients 104. A client 104 is a machine and/or software routine sending a request 103 to the data processing system 100 in order to obtain a set of output results 105.

In response to receiving a request 103, e.g. a database request which, as known to the skilled person, may be a SQL query for SQL-tables, at the data processing system 100, an incremental process may be applied to generate output results 105 which are returned to the client 104 in order to respond to the request 103. For example, at a first stage, data records are loaded from one or more databases of the data processing system 100. As known to the skilled person, data records stored in databases may be in the form of SQL-tables. Loading the data records may already include a filtering process by invalidating data records, such as erroneous data. At the second stage, a set of intermediate results is created based on the loaded data records by one or more known computing operations such as combining, aggregating or other operations. The intermediate results are filtered e.g. by a further round of invalidations. At a third stage, output results 105 are generated based on the intermediate results. A further round of filtering/invalidation of not applicable output results may be applied to the generated output results in order to determine final output results 105 which are to be returned to the client 104.

The invalidations at the three exemplary processing stages may be implemented by a plurality of function calls 107. As known in the art, a function call is a request made by a computer program code that performs a predetermined activity. Such a function call may be applied to data and may provide a return value. As also known in the art, a function call may invoke either only one function, whereas this function is taken from a predetermined set of functions, which have been defined by the computer program code. A function call may also involve a subset of more than one function, wherein such a subset is taken from the predetermined set of functions. Examples of function calls can be derived from the embodiments of the methodologies described herein, as set out further below. The function calls 107 from an input sequence 106 of function calls 107 are applied to the loaded data records at the first stage, to intermediate results at the second stage and/or at the third stage when reducing a set of output results to obtain a set of final output results 105 to be returned to the client 104. The function calls 107 check, if the loaded data records, the intermediate results and/or the output results are invalid.

For example, in a database system managing a cloud architecture with a hundred of servers, a request 103 is received in order to provide a suitable set of servers (requested output result) for processing a distributed task. The request 103 includes requirements that are to be fulfilled by the set of servers in order to process the distributed tasks, i.e. technical information about the servers, e.g. availability, free resources and processing capacity. The data processing system 100 processes this request 103 in the incremental stages as explained above.

At the first stage of loading the database records, the data processing system 100 loads information about the servers that are suitable in view of these requirements. Based on the loaded server information, a check for server availability is made by processing an availability function call. This function call may, for example, evaluate a variable assignment in the data processing system 100 for a server indicating whether or not the server is available. The function call may also involve more complex processing, e.g. by starting sub function calls in order to check the server availability, or by sending a ping to the server in order to evaluate if the respective server is currently available. Next, a utilization function call checks the actual utilization of the servers to determine free processing resources according to the requirements in the request 103. Again, this function call may be a simple variable check or a more complex function call. Finally, a capacity function call checks the processing capacity of the server. The three function calls 107 are applied in this sequence (=input sequence 106) to any of the servers given by the retrieved server information. Each of the servers may be invalidated by any of the three function calls 107. All servers which pass these three function calls 107, i.e. which are not invalidated by one of the function calls 107, fulfil the requirements of the request 103 in terms of availability, utilization and processing capacity. These servers are considered for further processing as a valid loaded data record of the first processing stage. Hence, a sequence of a plurality of three function calls 107 is applied to the server information retrieved from the database in order to invalidate servers which do not serve the requirements of the request 103. Such function calls 107 may be of different complexity.

At the second stage of processing the request 103 intermediate results are created by one or more operations based on the valid loaded data records. In the example, combinations of servers previously loaded and checked to be valid by the first sequence 106 of function calls 107 are permutated in order to find suitable combinations of servers. A combination of servers constitutes an intermediate result. These intermediate results are again filtered/invalidated, e.g. by being checked for the overall free resources of the combination of servers, as well as their overall processing capacity. These checks are performed by a second plurality of function calls 107 invalidating combinations, viz. intermediate results, that do not fulfil or sufficiently support the requirements of the request 103 and are therewith not to be included in the set of intermediate results exhibiting all combinations of servers contributing to the requirements of the request 103. It should be noted, that the second sequence 106 of function calls 107 checks the validity of intermediate results, but is different the previously applied sequence of operations for creating these intermediate results (generating the server combinations as mentioned above). Hence, checking intermediate results for validity and eliminating invalid intermediate results, potentially reduces the number of subsequent intermediate results created. Subsequent output results are then only computed on the basis of the valid intermediate results after filtering/invalidation.

Finally, at the third stage of processing, the set of valid intermediate results may be further processed to obtain output results. For, example, the remaining server combinations given by the valid intermediate results are brought into particular orders of servers to address technical requirements identified in the request 103. At this third stage, the output results generated by corresponding ordering computations are again filtered/validated, e.g. by checks implemented by a third sequence of plurality of function calls 107, proving if the combinations of ordered servers fulfilling the technical requirements identified by the request 103. The application of the third plurality of function calls 107 reduces the set of output results to a number of valid output results 105 to be returned to the client 104, hence a final set of output results 105. As an example, for invalidating output results, one or more of the combinations of servers are not applicable because all servers are located in the same area and therewith do not contribute to constraints of georedundancy in distributed computing environments.

It should be noted that the kind of function calls 107, e.g. if they check servers of a distributed system or millions of loaded data records and intermediate results in a big data environment, is not significant for the methodologies described herein. To the contrary, the methodologies described herein are based on the technical characteristics of function calls 107 themselves, e.g. frequency with which a function call invalidates data and the complexity of the function call resulting in a respective utilization of processing resources in terms of clock cycles per instruction (CPI).

Figure 2:
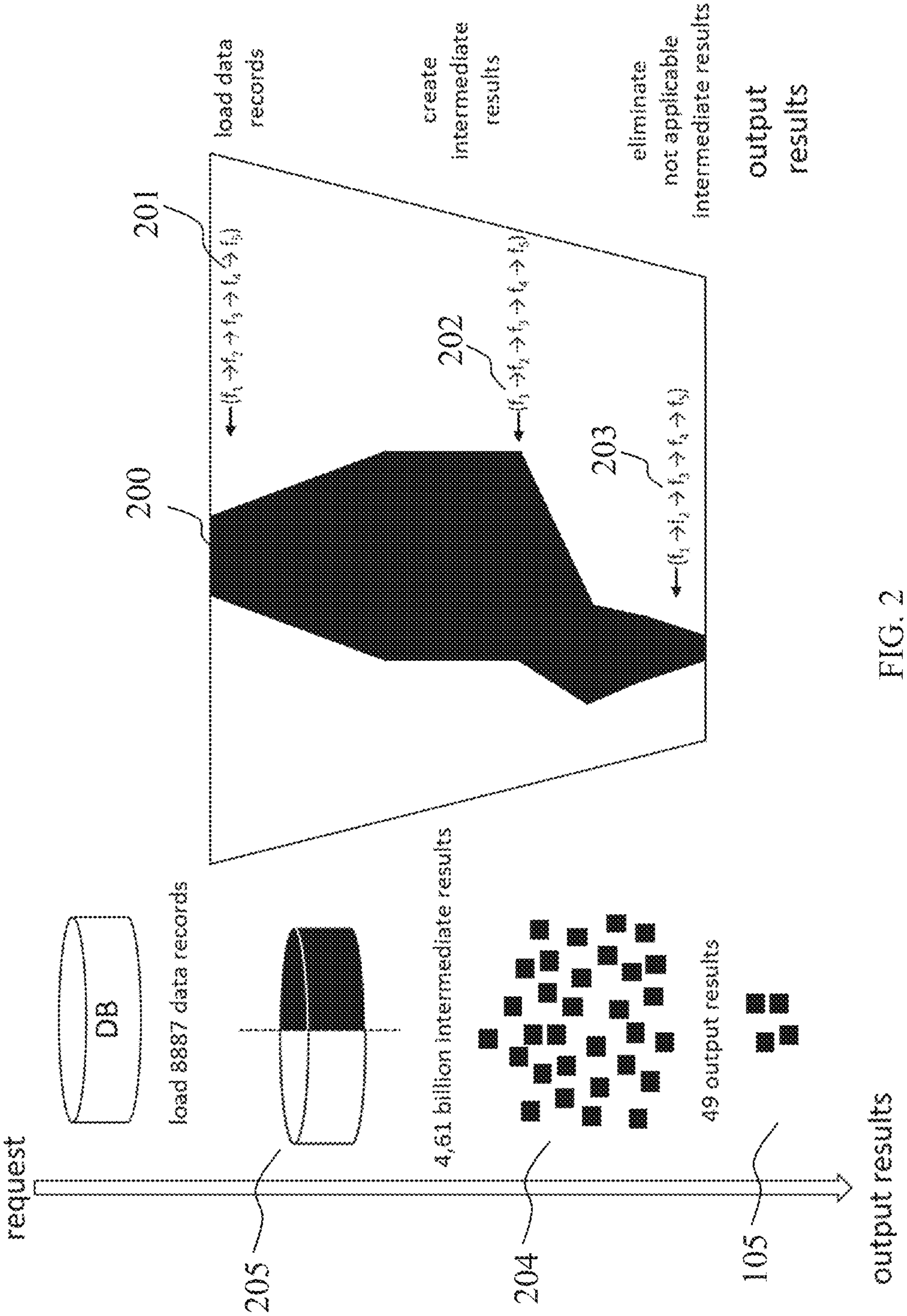
FIG. 2 shows an optimized path through the processing stages while processing a request.

In general, such sequences of function calls 107 to invalidate data are applied at one or more of any data processing stage, whereby the sequence is in a given a pre-determined or fixed order. The present mechanisms provide adaptively optimized sequences of function calls 107. A sequence of function calls 107 is inputted in an optimization process, when it is applied in order to invalidate loaded data or intermediate results or output results. The function calls 107 are processed according to an order in an input sequence 106 by one or more processors 102. The input sequence 106 is an ordered set of function calls 107 which are applied to particular loaded data records intermediate results or output results. For example, the three function calls 107 mentioned above, the availability function call, the utilization function call, and the processing capacity function call in this particular order are a particular input sequence 106 for the optimization process. Applying adaptively optimized sequences of function calls 107 on different stages of processing a request 103, provides an optimized path 200 through the different stages of processing impacting the processing cost of the whole process as demonstrated in FIG. 2. To invalidate an intermediate result, the input sequence 106 is applied to the created intermediate result 202 including function calls 107 e.g. for proving an error in the intermediate result, check different variable assignments or for computing and evaluating a check-sum. When the intermediate result is invalidated by a function call 107 while the intermediate result is processed according to the input sequence 106 the further processing of the input sequence 106 is aborted, since the intermediate result is not qualified to be further processed. A plurality of function calls 107 according to an input sequence 106 may also be applied to invalidated data records on the stage of loading data 201, on the stage of creating intermediate results or on the stage to obtain 203 a set of final output results 105 or on any other suitable stage of processing the data. The function calls 107 processed in accordance to an input sequence 106 may however be different on the different stages to account for specific invalidation criteria. The optimized path 200 through the different stages of processing the request 103 is mainly provided by two effects. The first effect is, that loaded data and/or intermediate results invalidated at an early stage in the processing, are not considered in later stages of the processing. Hence, the number of operations e.g. for creating intermediate results, as well as the number of invalidations checks by a sequences of function calls 107 is reduced. The second effect is, that the sequences of function calls 107 themselves, applied is not fixed but adaptively optimized in order to fail fast and therewith utilize minimal processing cost during invalidation.

Since in large-scale data processing systems 100 a request 103 potentially produces a set of millions up to billions, e.g. 4 billion, intermediate results 204 from e.g. thousands of loaded data records 205, which are then reduced to an output set of double-digit range final output results 206, e.g. 49, the processing cost for invalidating data records, intermediate results and output results is correspondingly expensive. Moreover, the large number of loaded data and intermediate results consume a high amount of storage resources, which also is significantly reduced by invalidating loaded data and intermediate results at early stages of the data processing.

Two main factors influence the cost for determining if a data record or an intermediate result is invalidated by a function call 107, namely the computing cost of processing the function call on a processor 102 and a probability with which the function call invalidates the data record or intermediate result based on previous processing of the function call.

The computing cost of processing a function call is can be measured by e.g. CPU (Central Processing Unit) time or CPI (clock cycles per instruction). Since function calls 107 may be of different complexity in processing the computing costs of the function calls 107 differ from each other. For example, a function call 107 checking a variable assignment may not utilize much CPU time on the one or more processors 102. A function call 107 determining a check sum out of a set of different variables and then evaluating the check sum for validity of an intermediate result may start a number of sub calls to be processed as well, before the function call 107 joins all sub calls to one check result and is completely processed. Such a nested function call is more expensive in computing cost in view of CPU time than e.g. a check of variable assignment. The CPU time of a function call 107 is dependent on the number of instructions the function call 107 causes on the processor 102, the CPU clock cycles per instruction and the number of seconds per clock cycle. Measuring computing cost by CPI has the advantage of an independent measure along different processors 102, since the number of seconds per clock cycle is processor specific. CPU time as well as CPI are measured by conventional system monitors or monitoring tools such as e.g. callgrind®.

As known in the prior art, the abort probability of a function call reflects the probability that the function terminates its activity and no further activities (e.g. further function calls) are started by that callback result of the function call. The abort probability is a statistical measure based on the outcome of previous processing iteration of a function call 107. The abort probability is dependent on the characteristics of function call 107 itself and also on the characteristics of the data to be processed in the data processing system 100. Function calls 107 may be manually or automatically pre-defined on the criteria that are proven to decide whether a data record and/or an intermediate result is invalid. A data record and/or an intermediate result is valid when each function call 107 processed in accordance with an input sequence 106 proved the data record and/or intermediate result to be valid in view of the checked criteria. A data record and/or intermediate result is invalid when a function call 107 processed in accordance to an input sequence 106 proved the data record/intermediate result to be invalid in view of the checked criteria. In response to such invalidation, no further function call 107 has to be processed for this data record and/or intermediate result anymore, since the data record and/or intermediate result is excluded from further processing. Hence, the frequency with which a function call 107 invalidates or not invalidates data records, intermediate results and/or output results when the function call 107 is processed may be captured in statistics providing an abort probability for the function call. Further, the statistics may also provide an abort probability depending on the abort probability of function calls 107 which were processed previously in accordance to an input sequence 106. Hence, different function calls 107 develop an independent abort probability and/or develop abort probability with respect of function calls 107 that were previously processed according to an input sequence 106. Moreover, function calls 107 may develop a change in their abort probability (independent or dependent) when the characteristics of the data records and/or intermediate results change over time, as it is usual in large-scale data processing systems undergoing evolutions and developments (e.g. functionality updates, changes of the database contents) over time.

In some embodiments, a sequence of a plurality of function 107 calls is executed by at least one processor 102. The plurality of function calls 107 is processed according to an input sequence 106. A function call 107 may check if a data record loaded from a database and/or an intermediate result created by processing the data record is invalid. However, the function calls 107 being processed according to the input sequence 106 are not restricted to this application.

Each function call 107 of the plurality of function calls 107 is associated with an abort probability. The abort probability of a particular function call 107 indicates a probability that processing the particular function call 107 causes an abort of the processing of the input sequence 106 as explained above. Aborting the further processing of the input sequence 106 is effected when the function call 107 invalidates a data record and/or intermediate result during the processing.

Each function call 107 of the plurality of function calls 107 is also associated with a processing cost per function call 107 on the basis of a number of processor instructions of the respective function call and the abort probability of the respective function call 107. As known in the art, processing costs of a function call are determined by processor costs for executing the function call, storage costs for e.g. data records, intermediate and output results and transmission costs for any data such as data records, intermediate and output results. The processing cost of a function call may be obtained in any suitable way on the basis of the determined computing cost, the abort probability or both. The abort probability for at least a subset of the plurality of function calls 107 is updated during the processing of the plurality of function calls 107 until a particular function call 107 aborts the processing of the input sequence 106 or the last function call 107 in the input sequence 106 is processed. The processing cost for at least the part of the plurality of function calls 107 is updated during the processing of the plurality of function calls 107, until a particular function call 107 aborts the processing of the input sequence 106 or the last function call 107 in the input sequence 106 is processed.

Figure 4:
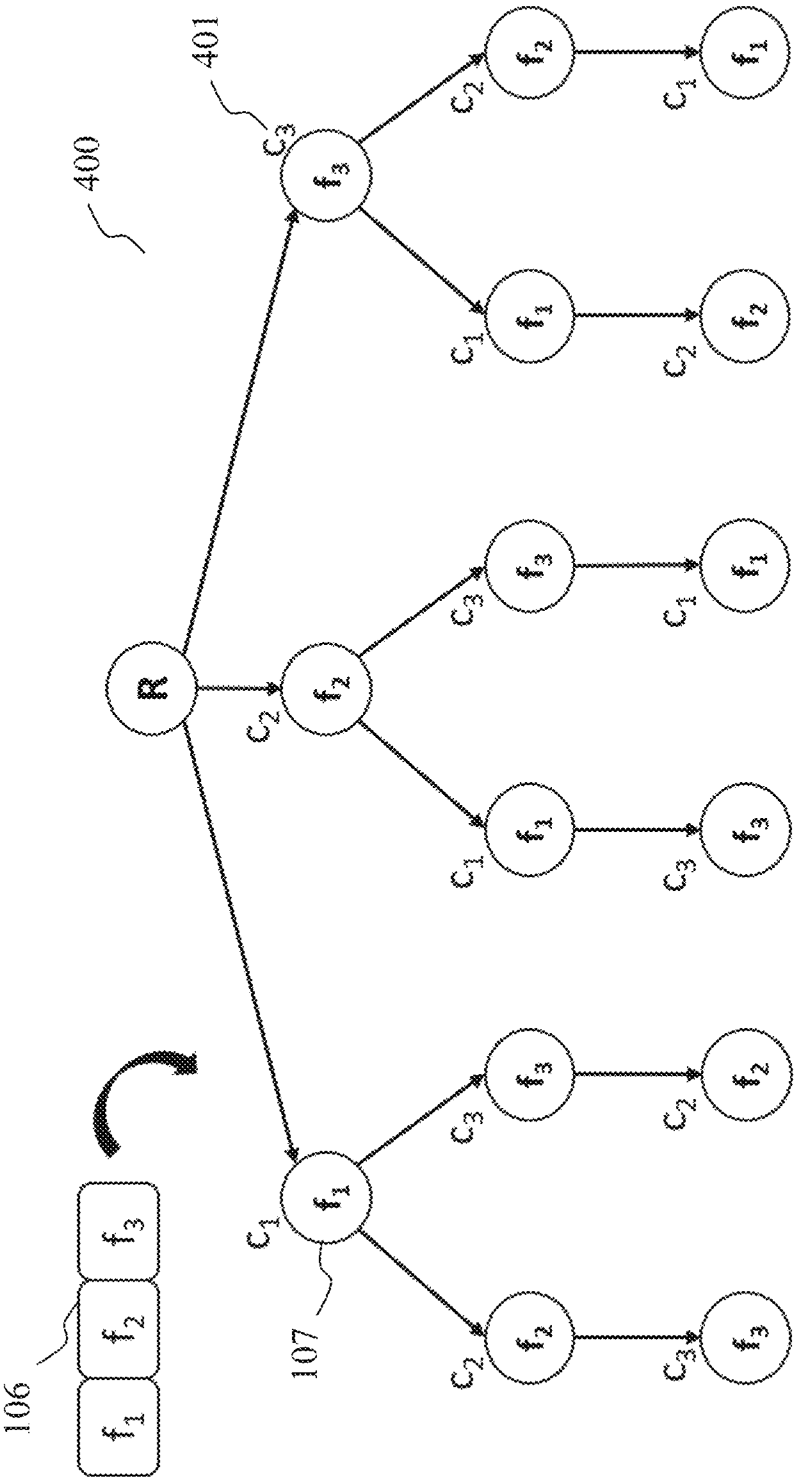
FIG. 4 visualizes the optimization based on independent abort probabilities.
Figure 5:
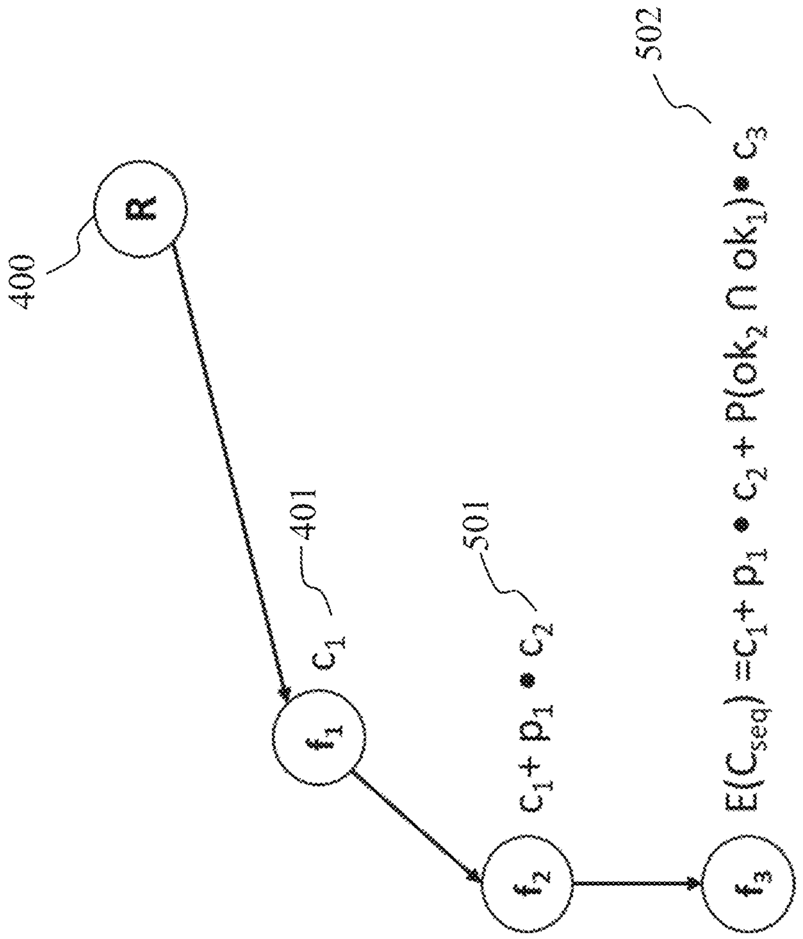
FIG. 5 shows the optimization based on dependent abort probabilities.

As further known in the art and also described in subsequent paragraphs and shown in FIG. 4 and FIG. 5, optimized function sequences may be determined in several steps using e.g. greedy algorithms such as Dijkstra algorithms or Monte-Carlo-Tree Search by optimizing one or more optimization parameters such as processing costs and abort probabilities. Within the current example, an updated input sequence is determined by rearranging the order of the function calls 107 at least on the basis of the processing cost of the function calls 107. Hence, to optimize the processing cost for an input sequence, function calls 107 being assigned with high abort probability in combination with low computing cost, may be put in the front of the updated input sequence, such that the next iteration of the sequence of input functions is processed in an optimized way, e. g. with less processor instructions, according to the current measurements for the processing cost. This yields to an updated sequence with reduced processing costs and abort probabilities, since a reduced number of processor instructions is executed and intermediate data proven to be invalid does not need to be stored anymore. The processing of function calls 107 according to the updated input sequence 106 is iterated 307 on the next data record, intermediate result and/or output result, therewith invalidating the data record, intermediate result and/or output result and simultaneously adaptively optimizing the processing of function calls 107 in accordance with their updated order in the input sequence 106.

In example embodiments, the data processing system 100 shown in FIG. 1 applies a plurality of function calls 107 according to an input sequence 106 to compute from a received request 103 a set of output results 105 to be returned to a client 104. For the sake of simplicity, the plurality of function calls 107 processed according to the input sequence 106, is applied to a set of intermediate results after data records were loaded from the tables of one or more databases and after creating intermediate results. Nevertheless, the input sequence 106 may also be applied to invalidate data records in the process of loading the data records from the database and/or creating intermediate results to decide whether to include the created intermediate results into a set of intermediate results for further processing. It also may be applied to invalidate output results which are not applicable. The input sequence 106 is applied to the intermediate results in order to check whether a particular intermediate result is invalid and therewith is to be removed from the set of intermediate results for obtaining the output results 105.

Figure 3:
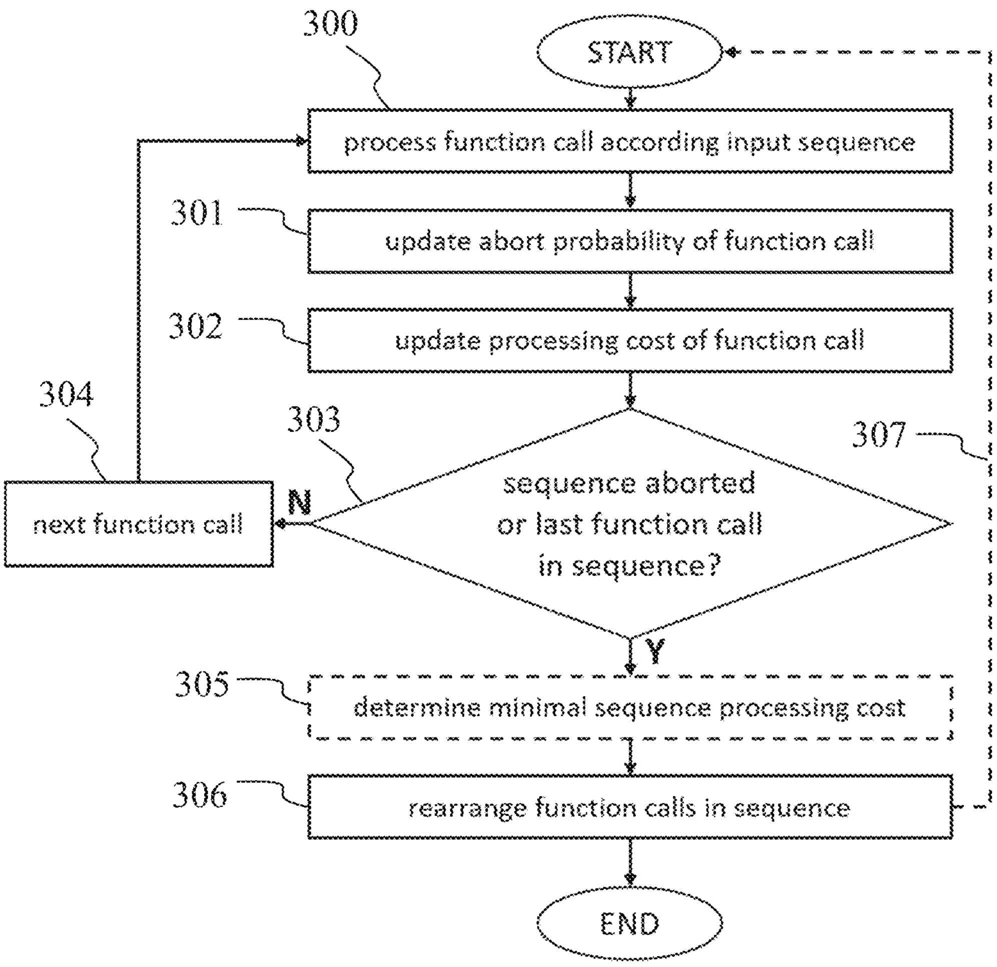
FIG. 3 shows a flowchart for adaptively optimizing the input sequence of function calls.

The first function call 107 is processed according to the input sequence 107 as shown in 300 in FIG. 3. For example, the first function call 107 according to the input sequence 106 is a check for the validity of an assignment of a variable in the intermediate result, which is performed. While processing, an abort probability of the function call 107 is updated 301. This abort probability is, for example, updated by a monitor 109 in FIG. 1 which already has tracked previous abort and pass events of the function call 107 and therefrom continuously updates 301 the abort probability after each iteration of the processing of the function call 107. Additionally, the computing cost of the function call 107 also is continuously updated by the monitor 109 in each iteration of processing the function call 107. The processing cost of the function call 107 then also is updated 302 on the basis of the updated abort probability 301 and the updated computing cost.

If the function call 107 invalidates the currently checked intermediate result 303 and therewith aborts the processing of successor function calls 107 according to the input sequence 106 or if the last function call 107 according to the input sequence 106 is reached 303 no further function calls 107 in this iteration are processed. If the processing of the function calls 107 according to the input sequence 106 is not aborted or finished, the processing continues 304 with the processing 300 of the next function call 107.

If no further function calls 107 are processed, because an input sequence 106 has been aborted or processed completely, the ordering of processing the function calls 107 according to the input sequence 106 is rearranged 306. The rearrangement is processed by an optimizer 108 shown in FIG. 1 using the processing cost for each of the function calls 107 provided by the monitor 109. It should be noted that the processing cost of at least a subset of the function calls 107 (those which were processed in the current iteration of the input sequence 106) have been updated 302. Where the processing of a function call 107 results in an abort of processing further function calls 107 according to the input sequence 106, the abort probability, computing cost and therewith the processing cost of the further function calls 107 in the input sequence 106 which are not processed due to the abort are not updated. Hence, all function calls 107 to be processed in accordance to the ordering in the input sequence 106 are considered by the rearrangement 306 with respect to their processing cost, whether their processing cost has been updated or not. A sequence processing cost may be determined 305 to serve as a measure for a comparison between different orderings of function calls 107 in an input sequence 106, which is elaborated in more detail below.

The rearrangement 306 of function calls 107 in the order of an input sequence 106 results in an updated sequence which then is provided 207 by the optimizer 108 to the data processing system 100 in order to update the current input sequence 106. Hence, in the next iteration of processing the function calls 107 according to the input sequence 106, the function calls 107 are processed in the order of the updated input sequence 106 and therewith in an optimized ordering. Additionally, the ordering of the input sequence 106 is optimized in each iteration, viz. on each data-record and/or intermediate result in view of actual abort probabilities, computing cost and therewith processing cost.

In contrast to U.S. Pat. No. 7,650,331 using a configured, but fixed ordering of operations to obtain a set of output results from intermediate results (e.g. by filtering), the methodology disclosed herein utilizes an adaptive approach to invalidate intermediate results and output results to obtain a final set of output results 105 to be returned to the client 104. As already pointed out, the ordering of the input sequence 106 is optimized in a way, that the updated input sequence 106 is in an ordering that minimizes processing cost, e.g. by putting function calls 107 with high abort probability and low computing cost in front of the updated input sequence 106. Hence, intermediate results computed in response to receiving a request 103 at a data processing system 100 are invalidated by applying an adaptively optimized input sequence 106, resulting in a faster invalidation with low processing cost where the set of intermediate results and output results are reduced to a set of final output results 105 to be returned to the client 104. This allows for reducing a potential set of billions of intermediate results to a number of final output results 105 in, for example, a single- or double-digit range with a minimum of processing cost. Where data records at the stage of loading data are invalidated by applying an adaptively optimized input sequence 106 and/or another adaptively optimized input sequence 106 is applied at the stage of creating intermediate results and avoiding to include invalid intermediate results in a set of intermediate results to be further processed, this has a propagating synergetic reduction effect.

Where loaded data records are invalidated, these data records are excluded from being further processed to create intermediate results. Hence, invalidating data records at this early stage reduces storage resources for data records and additionally propagates the reduction to the next stage where fewer intermediate results are created also saving storage resources. Additionally, this saves processing time for intermediate results which then not are created. Further, where intermediate results are invalidated after creation to avoid invalid intermediate results in the set of intermediate results to be further processed, this reduction propagates to the stage where the set of intermediate results is reduced in order to create a set of output results. Hence, the number of intermediate results in the set of intermediate results that are invalidated in order to obtain a set of output results has been reduced beforehand.

In example embodiments the data processing system 100 is extended by a shadow data processing system, processing the update of the processing cost 302, especially of the abort probability in parallel to the data processing system 100. Hence, if a respective function call 107 aborts the processing of subsequent function calls 107 in the input sequence 106, the shadow data processing system continues the processing 304, in order to determine also an update for the abort probability 301 of the subsequent function calls 107. Otherwise, the abort probability of function calls 107 not updated, remain unchanged until the next processing of the respective function call, then being assigned with an abort probability not updated in the last processing. In other example embodiments the abort probabilities and processing costs are generally provided by a shadow system, determining the abort probabilities and processing costs offline.

In test scenarios, the consumption of CPU resources measured for the complete iteration of processing requests, viz. receiving requests 103 up to providing final output results 105 was reduced by 10% up to 50%. Additionally, it was recognized that the reliability of the data processing system 100 increased by reducing the number of timeouts in processing intermediate results, because the methods and system described herein avoid to include invalid intermediate results in the set of intermediate results, which otherwise would cause errors or delays while reducing the set of output results to a set of final output results 105.

Compared to the reduce process in U.S. Pat. No. 7,650,331 reducing the number of intermediate results by e.g. filtering only in the stage of obtaining final output results, the methodologies described herein invalidate loaded data records, intermediate results and/or output results on different stages of the request processing in order to find an optimized processing path 200, significantly reducing processing cost, since invalid data records and/or intermediate results are invalidated at early stages of processing the request 103. And invalidated data records and intermediate results are not further considered for subsequent operations and validity checks. Additionally, also storage resources are saved, since invalidated data records and/or intermediate results do not have to be kept into storage for further processing, but are eliminated. Further, compared to U.S. Pat. No. 7,650,331 where the reduce process is configured in a specific order or is not limited to any particular order the methodologies described herein utilize an input sequences 106 for processing function calls 107 in an adaptively optimized order to invalidate loaded data records and/or intermediate results during the processing of a request 103 to obtain output results 105. The invalidation of data records, intermediate results and/or output results is adaptively optimized itself, by identifying an order of function calls 107, which are performed in order to decide on invalidation of data records, intermediate results and/or output results, based on their respective abort probability and computing costs, therewith reducing processing cost to a local or global minimum, depending on the optimization strategy. Instead of utilizing a fixed pre-defined or arbitrary order as pointed out in U.S. Pat. No. 7,650,331, the order of function calls 107 in the input sequence 106 is optimized in an adaptive, iterative process taking continuously updated computing cost utilized on the processors 102 of the data processing system 100 and a continuously updated abort probability 301 of the function calls 107 into consideration. Hence, the optimization adapts to the changing environment of an evolving data processing system 100.

Further, in contrast to EP 2 869 257 A1, computing a fixed data model for reducing choice options of a user, the methodologies described herein adaptively optimize the processing of function calls 107 according to an input sequence 106 for fast invalidation of data during data processing taking measurements of computing cost and abort probabilities of the function calls 107 into consideration.

In other embodiments, a sequence processing cost of a sequence is given by the sum of the processing cost per function call until the abort of the processing of the sequence and the sequence processing cost of the updated sequence is lower than the processing cost of the input sequence 106.

In example embodiments, the optimizer 108 in FIG. 1 determines the optimal ordering for the rearrangement 306 in FIG. 3 by evaluating all possible permutations for an ordering to process the function calls 107 according to the input sequence 106. For each permutation of the ordering to process the function calls 107 in the input sequence 106, a sequence processing cost is computed 305 by adding up the processing cost for each function call 107 in the permutated sequence, until a function call 107 aborts the further processing of function calls 107 in the permutated sequence, e.g. because the function call 107 results in an invalidation of the intermediate result. Then, the next permutation of the ordering to process the function calls 107 according to the input sequence 106 is processed until for each permutation the sequence processing cost is determined 305. Then, the ordering to process the function calls 107 in the permutation with minimal sequence processing cost is applied to rearrange 306 the function calls 107 in the input sequence 106 to provide the updated input sequence. The updated input sequence may be utilized 307 for the next iteration on the next data record, intermediate result or output result to be invalidated.

By evaluating all possible permutations of the ordering to process the function calls 107 according to the input sequence 106 and choosing the ordering with minimal sequence processing cost for the rearrangement 306 of the function calls 107, a total optimum for the processing cost for the plurality of function calls 107 is determined, and therewith the invalidation of data records, intermediate results and/or output results is optimized in regard to abort probability and computing cost on which the processing cost of the function calls 107 is based on and which therewith also applies to the minimal sequence processing cost.

In some embodiments, the processing of a plurality of function calls 107 according to an input sequence 106 further includes to determine the processing cost of a function call and the abort probability over plurality of processing iterations independently.

The processing cost including the abort probability are in general determined under the assumption that the processing cost including an abort probability for processing a function call 107 is independent from the processing cost including other abort probabilities of previously processed function calls 107. Hence, the update probability and therewith the processing cost is determined 302 for each function call 107 separately. For example, as already pointed out, the monitor 109 updates the abort probability 301 of a function call 107 with respect of the result of the actual iteration of processing the function call 107. E.g. where the function call 107 has an abort probability of 0.5 because of two iterations of processing the function call previously, resulting in one abort (1) and one pass (0), yielding (0+1)/2=0.5. If now, the current iteration of processing the function call 107 aborts the further processing of subsequent function calls 107 according to the input sequence 106, the abort probability is updated 301 with the event of aborting (1) yielding (0+1+1)/3=0.67. However, the determination of an independent abort probability for a function call 107 is not restricted to be obtained in such a way. Since the processing cost, for the function call 107 is based on an abort probability of the function call 107 as well as on a computing cost utilized by the function call 107 on a processor 102, the processing cost is impacted by the update of the abort probability 301, as well as by the update of the computing cost.

In example embodiments, an independent processing cost $c_i$ of a function call 107 under the assumption that the abort probability of a function call 107 is independently determined from abort probabilities of function calls 107 previously processed according to the input sequence 106, by:

$$c_i = \frac{[\alpha \cdot c_{det} + \beta \cdot c_{sto}]}{2} \quad \text{(Equ. 1)}$$

wherein $c_{det}$ are the deterministic cost indicated by a physical measurement, e.g. measurement of CPU time or CPI, $c_{sto}$ are the stochastic cost indicated by (1−P(ko))|s/2, whereby P(ko) is the statistically determined abort probability of the function call 107 and s is the standard deviation. The parameters α and β are weighting factors, that are used to control the focus of the influence of the deterministic and the stochastic fraction of the processing cost in any direction. For example, if only the computing cost in terms of CPU time is considered, a is set to 1 while β is set to 0. Where only the abort probability is considered α is set to 0 while β is set to 1. To take both fractions into consideration any weighting of the two fractions may be used to control the influence of the fractions on the processing cost.

In example embodiments illustrated in FIG. 4, three function calls 107 $f_1$, $f_2$ and $f_3$ processed according to an input sequence 106, are optimized by spanning a tree structure 400 including all permutations of an ordering of the three function calls 107 in the input sequence 106. Each node, representing a function call 107, has a processing cost 401 $c_1$, $c_2$ and $c_3$ for the respective function call 107 according to $c_i$ of Equ. 1 including an independently determined abort probability. From a root node R each branch of the tree structure 400 from root R to a leaf represents one permutation of the ordering of function calls 107 according to the input sequence 106. Hence, since the processing cost 401 of each function call 107 includes an independent abort probability, the sequence processing cost for each permutation of the ordering of function calls 107 in the input sequence 106 is determined 305 by summing up the processing cost 401 along each branch from root R to the respective leaf e.g. $c_{permuation}=c_1+c_2+c_3$ for the left most branch. Where the processing of a function call 107 aborts the processing of further function calls 107 according to the sequence in the permutation, only the processing cost of the processed function calls 107 are summed up. For example, the processing of function calls 107 according to the left most branch is aborted, because function call $f_2$ invalidates the currently checked intermediate result, function call $f_3$ is not processed and the sequence processing cost for the permutation represented by the left most branch of the tree structure 400 is determined 305 by $$c_{permuation}=c_1+c_2.$$

In Table 1, example measurements for three function calls 107 are shown with their respective processing cost $c_i$ 401 according to Equ. 1. For the sake of simplicity, the deterministic and stochastic fraction of the function calls $f_1$, $f_2$ and $f_3$ are both considered to be equal in influence on the processing cost, and therewith weighting factors α and β are set to 1. Each permutation of the input sequence 106 according to the tree structure 400 now is processed with regard to the processing and update according to 300 to 305 in FIG. 3. For example, the input sequence $f_1$-$f_2$-$f_3$ is processed first, which is represented in the left most branch of the tree structure 400. First, function call $f_1$ is processed. The abort probability of $f_1$ is updated by the monitor 109 in FIG. 1 yielding P(ko)=0.237415 according to the update in 301 of FIG. 3.

TABLE 1

| | CPU time | P(ko) | P(ok) | s | α | β | $c_i$ |
|---|---|---|---|---|---|---|---|
| $f_1$ | 0.032251 | 0.237415 | 0.762585 | 0.425499 | 1.00 | 1.00 | 0.5037928 |
| $f_2$ | 0.012757 | 0 | 1 | 0 | 1.00 | 1.00 | 0.5063785 |
| $f_3$ | 0.012757 | 0.991043 | 0.008957 | 0.094218 | 1.00 | 1.00 | 0.0344115 |

TABLE 1-continued

| proc | $f_1$ - $f_2$ - $f_3$ | $f_1$ - $f_3$ - $f_2$ | $f_2$ - $f_1$ - $f_3$ | $f_2$ - $f_3$ - $f_1$ | $f_3$ - $f_1$ - $f_2$ | $f_3$ - $f_2$ - $f_1$ |
|---|---|---|---|---|---|---|
| 1 | 0.50379275 | 0.50379275 | 0.5063785 | 0.5063785 | 0.0344115 | 0.0344115 |
| 2 | 1.01017125 | 0.53820425 | 1.0101713 | 0.54079 | 0.5382043 | 0.54079 |
| 3 | 1.0445828 | 1.0445828 | 1.0445828 | 1.0445828 | 1.0445828 | 1.0445828 |

Next, the processing cost of the function call $f_1$ is determined by measuring the computing cost by the monitor 109 and determining the processing cost $c_1$ according to Equ. 1 considering the abort probability and deterministic cost fraction represented by the CPU time yielding $c_1$=0.5037928. The function call $f_1$ is not aborted and it is also not the last function call 107 in the permutation of function calls 107 represented by the left most branch of the tree structure 400. Hence, the processing and update according to 300 to 303 is processed for function call $f_2$ yielding $c_2$=0.5063785 and again for function call $f_3$ yielding $c_3$=0.0344115. This is shown in the upper part of Table 1 in the right most column.

The sequence processing cost for the permutation of function calls $f_1$-$f_2$-$f_3$ is determined 305 by summing up the processing cost c1, c2 and c3 yielding $c_{permuation}$=1, 0445828. Since the processing cost 303 for all function calls 107 are determined under the assumption of independent abort probabilities, the sequence processing cost is the same for all permutations of the function calls 107, given that the processing of the permutation is not aborted until the last function call 107 in the permutation is processed, viz. the iteration of the processing according to 300 to 303 arrives from the root node R to the leaf in every branch of the tree structure 400. This also can be seen in the last row of Table 1.

Nevertheless, the abort probabilities of the function calls 107 in the input sequence 106 are different from each other. For example, function call $f_2$ has an abort probability of 0, meaning that the processing of the input sequence 106 will never abort while performing processing 300 for this function call 107. To the contrary, function call $f_3$ has an abort probability that is close to 1, meaning that it is very likely, that the processing of the input sequence 106, will abort while performing processing 300 for function call $f_3$. Where the input sequence 106 is aborted in an iteration the sequence processing cost, as already pointed out, only will take the cost for the function calls 107 into consideration that indeed have been processed. Hence, the optimizer 108 in FIG. 1 determines 305 for each processing 300 of a function call 107 in each permutation the sequence processing cost, if the further processing is aborted while processing the respective function call 107, as can be seen in the lower part of Table 1. E.g. if the processing of the permutation $f_1$-$f_2$-$f_3$ is aborted while processing function call $f_1$, the sequence processing cost of the permutation results in $c_{permuation}$($f_1$-$f_2$-$f_3$)=$c_i$=0.50379275. Where the processing is aborted while processing function call $f_2$, the sequence processing cost of the permutation results in $c_{permuation}$($f_1$-$f_2$-$f_3$)=$c_1$=1.01017125 and so forth. Hence, in order to abort the processing of function calls 107 in the input sequence 106 as fast as possible, permutations with minimal sequence processing cost are preferred. It turns out, as can be seen by the lower part of Table 1, that indeed the permutations of function calls 107, in which $f_3$ having the highest abort probability P(ko)=0.991043, is in front of the ordering of processing (right branch of the tree structure 400) has the lowest processing cost $c_3$=0.0344115 when the processing of the function calls 107 is aborted while processing 300 function call $f_3$ first. Even where the processing is not aborted while processing $f_3$, but when processing a second function call, or where $f_3$ is processed as second function call 107 according to the ordering of the permutation, viz. $f_1$-$f_3$-$f_2$, $f_2$-$f_3$-$f_1$, $f_3$-$f_1$-$f_2$ and $f_3$-$f_2$-$f_1$ are of less sequence computing cost, when aborting the processing at the first or second function call 107 in the ordering of the permutation, than those input sequences 106 having $f_3$ as the last function call 107 in the ordering of the permutation. After all, the ordering of permutation $f_3$-$f_1$-$f_2$ of the function calls 107 is selected to rearrange 306 the function calls 107 in the input sequence 106 (operation 306 in FIG. 3) to obtain an updated sequence. This permutation provides a lowest sequence processing cost where the input sequence 106 likely aborts while processing the first ($c_{permuation}$=$c_3$=0.0344115) and also where the input sequence 106 aborts while processing the second ($c_{permuation}$=$c_3$+$c_1$=0.5382043) function call 107 according to the ordering of the input sequence 106. The determined updated sequence $f_3$-$f_1$-$f_2$ is then provided to update the current input sequence $f_1$-$f_2$-$f_3$. Hence, in the next application of the input sequence 106, e.g. on a next intermediate result that is checked for invalidity, the plurality of function calls $f_1$, $f_2$, and $f_3$ is processed according to the updated ordering of the input sequence $f_3$-$f_1$-$f_2$ again being optimized by the adaptive optimization shown in FIG. 3 and explained above.

The abort probability and processing cost of each function call 107 is independent of the abort probability and processing cost of function calls 107 previously processed according to the input sequence 106. The sequence processing cost for each permutation of function calls 107 depends on the independent processing cost of each function call 107, until the input sequence 106 is aborted. This allows to adaptively find the optimal ordering of function calls 107 in the input sequence 106 in order to invalidate data in a data processing system 100 with optimized processing cost. Determining the processing cost of a function call 107 based on a weighted independent abort probability and weighted computing cost, allows to emphasize different focus on processing cost in respect to CPU time and abort probability, or a combination of both. This allows for a respective control over the focus of the optimization where the abort probabilities of the function calls 107 are not correlated.

In some embodiments, the determination of an updated input sequence further includes to determine an average expected cost $E(C_{seq})$ for each permutation of function calls 107 in the input sequence 106. The average expected cost $E(C_{seq})$ is determined by a dependent success probability for at least the part of function calls 107 in the input sequence 106, processed until a function call 107 aborts the further processing of function calls 107 in the input sequence 106. The dependent success probability $P(Ok_{n-1} \cap \ldots \cap Ok_2 \cap Ok_1)$ is a success probability of the function call $f_n$ in dependence of the success probability of the predecessor function calls in the order of the input sequence 106 already processed. Then, for each permutation of function calls 107 the average expected cost $E(C_{seq})$ is determined by the sum of all products of the dependent success probability $P(Ok_{n-1} \cap \ldots \cap Ok_2 \cap Ok_1)$ and the processing cost $c_i$ for at least the part of function calls 107 according to the following equation Equ. 2:

$$E(C_{seq}) = c_1 + \sum_{i=1}^{n-1} \left( P\left( OK_i \bigcap_{k=1}^{i-1} OK_k \right) \cdot c_{i+1} \right) \quad \text{(Equ. 2)}$$

Then, the permutation with the minimal average expected cost $\min_{sea} E(C_{seq})$ is selected by the determination in 305 of FIG. 3 and the function calls 107 are rearranged 306 according to the order of the selected permutation.

FIG. 5 shows an example of the average expected cost $E(C_{seq})$ of the permutation $f_1$-$f_2$-$f_3$ of function calls 107 in the input sequence 106 indicating for each function call 107 processed by the processing and updates according to 300 to 303 in FIG. 3 the average expected cost $E(C_{seq})$ of the permutation, if the processing of the respective function call aborts the further processing of the permutation (similar to the second column in the lower part of Table 1, but with dependent abort probabilities). The dependent success probabilities $P(ok_{n-1} \cap \ldots \cap ok_2 \cap ok_1)$ are provided by the monitor 109, or may be also computed in combination with the optimizer 108. With the average expected cost $E(C_{seq})$ the sequence processing cost for each of the permutations, according to the proceeding already shown for the independent processing cost in FIG. 4 in combination with Table 1, is obtained to find the optimal ordering of function calls 107 in the input sequence 106, viz. the permutation with the minimal average expected cost $\min_{seq} E(C_{seq})$. If the first function call 107 in the permutation aborts the processing of further function calls 107 in the permutation, the average expected cost $E(C_{seq})$ for this permutation equals the independent processing cost $c_i$ for the first function call in the permutation. Hence, there is no dependent abort probability and correlation of no previously processed function calls 107 has to be considered.

In data processing systems 100 processing millions of data records and intermediate results, a correlation between the abort probabilities of function calls 107 in an input sequence 106 likely exists. Processing function calls 107 according to an adaptively optimized ordering of an input sequence 106 with respect to a minimal average expected cost $\min_{seq} E(C_{seq})$ considers this correlation and also a potential development or change of this correlation over time. It also contributes to optimize the ordering of function calls 107 according to an adaptively optimized input sequence 106, even if the processing of further function calls 107 according to the input sequence 106 is not aborted. Where only independent abort probabilities are considered the processing cost for all input sequences 106 not aborted at all is equal, as already can be seen in the last row of Table 1.

Considering the influence of the order of function calls 107 in the input sequence 106 allows for an optimization of processing cost where none of the function calls 107 is aborted, respecting the influence of the abort probability of function calls 107 previously processed according to the input sequence 106. Hence, also if all intermediate results are valid and no invalidation aborts the processing of further function calls 107, the ordering of function calls 107 in the input sequence 106 is optimized to minimal processing cost, since the influence of the ordering of the function calls 107 amongst each other is respected.

In other embodiments, function calls 107 having an abort probability of 0 are removed from the input sequence 106 before determining an updated input sequence. Function calls 107 having an abort probability of 0 will never abort the processing of the input sequence 106. Hence, they will add computing cost on the one hand, but without prospect to abort the sequence on the other hand. In view of an optimization that aims at minimizing processing cost, these are worst-case function calls 107 since they do not contribute to the optimization aim.

The processing of all permutations of function calls 107 in an input sequence 106 by an optimizer 108 quickly becomes costly in regard to processing cost for creating and processing the permutations itself. The input sequence 106 of FIG. 4 includes three function calls 107 and creates 3!=6 permutations. An input sequence 106 with 11 function calls 107 already creates 11!=39.916.800 permutations, whereby each of the permutations has to be processed to determine 305 a sequence processing cost or average expected cost for each permutation. An input sequence 106 with 19 function calls 107 even creates $10^{17}$ permutations to be processed in order to find an optimal ordering for updating the input sequence 106 of function calls 107.

Hence, function calls 107 having an abort probability of 0 and do not contribute to the optimization aim are removed from the input sequence 106 by the optimizer 108 before optimization, such that the permutations of the function calls 107, e.g. in a tree structure 400 in FIG. 4, are only created and processed on the remaining function calls 107, which reduces the size of the tree structure 400 by pruning all branches which have such a function calls 107 as parent node.

Figure 6:
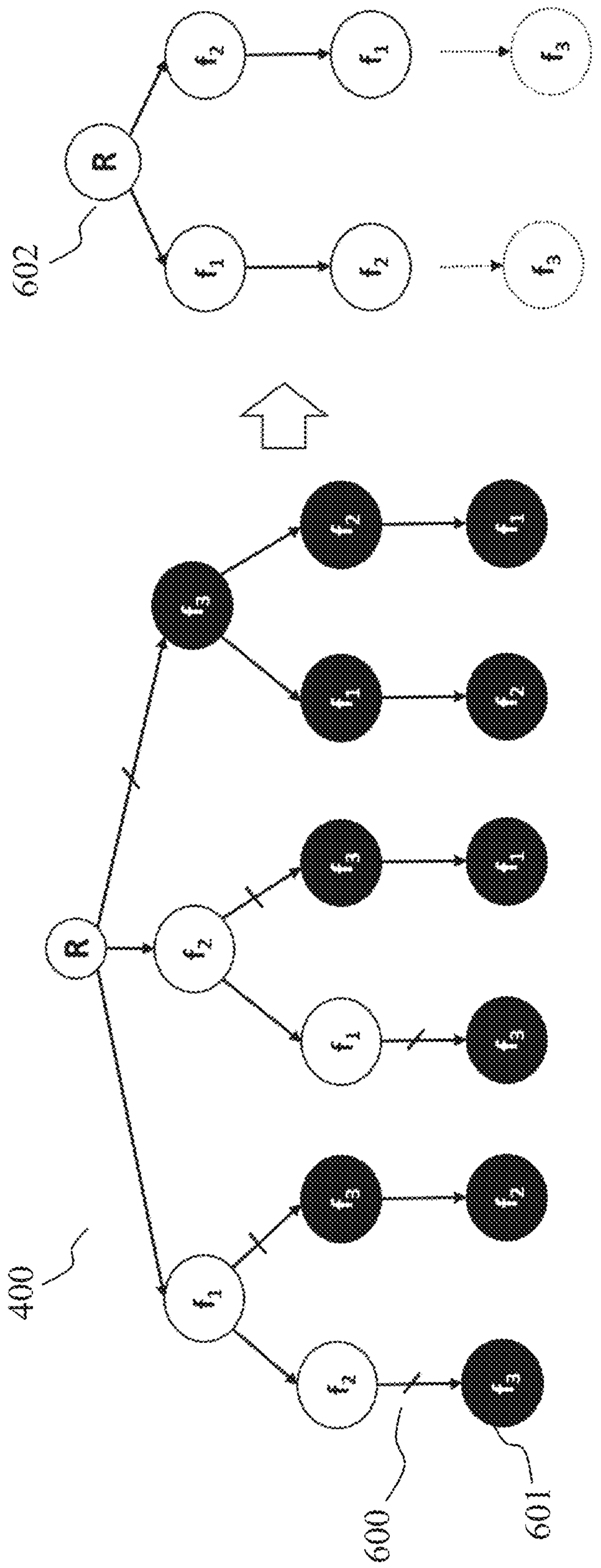
FIG. 6 illustrates a reduction of function calls during the optimization.

In example embodiments, the reduction of permutations and processing of function calls 107 is demonstrated in FIG. 6. If, for example, in the tree structure 400 of FIG. 4, the node representing the function call $f_3$ has an abort probability of 0, all branches having this node as parent node 601 (black nodes) are pruned 600. As a result, building a tree structure 400 on the remaining function calls $f_1$ and $f_2$ leads to a reduced tree structure 602. After processing all permutations of the reduced tree structure 602 the removed function calls 107, e.g. $f_3$, are appended at the end of the processed permutations, since they do not contribute to the optimization as explained above. Hence, the number of permutations and function calls 107 that are processed by the processing and updates according to 300 to 305 in FIG. 3 is reduced from 3!=6 permutations, each with three function calls 107, to 2!=2 permutations, each with two function calls 107. Testing the pruning 600 of the tree structure 400 on a test data processing system 100 processing 19 function calls 107 according to a start input sequence 106 reduced the number of permutations from $19!=10^{17}$ permutations to a number of 7!=5010 permutations to be processed.

Hence, the processing cost for optimizing the input sequence 106 are significantly reduced by removing those function calls 107 having an abort probability of 0 while adaptively optimizing the ordering of function calls 107 in the input sequence 106.

Figure 7:
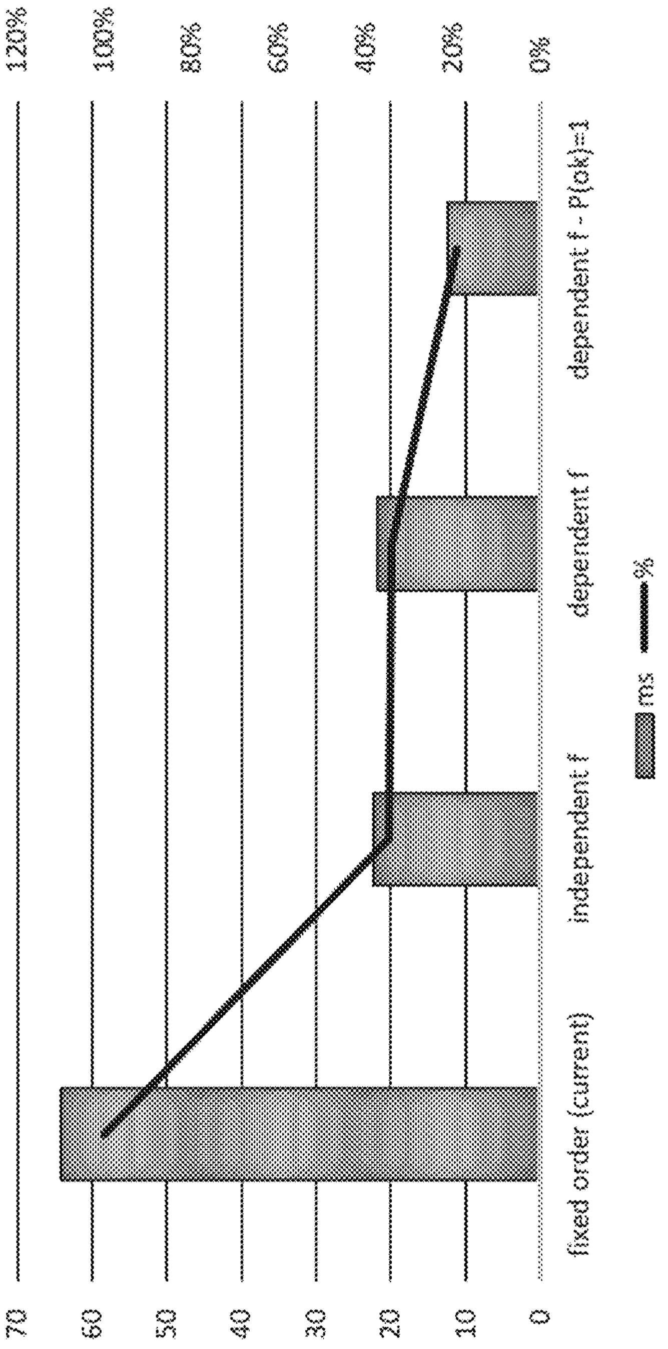
FIG. 7 presents test results for different optimization strategies.

Summarizing tests performed according to the different embodiments, FIG. 7 shows the respective impact of the different embodiments on the overall computing cost that is utilized by processing an invalidation on a test set of intermediate results and simultaneously, as described above, perform the different variations of adaptive optimization. Invalidating a test set of intermediate results by applying a plurality of function calls 107 according to an input sequence 106 in a fixed order as currently used, was tested to take on average 64.12 milliseconds (ms) of computing cost on a test system for the invalidation without the mechanisms described herein. On the same system, the plurality of function calls 107 processed according to the input sequence 106 was simultaneously optimized by the optimization strategy according to Equ. 1. Invalidating the test set of intermediate results by applying the function calls 107 according to the adaptively optimized input sequence 106 according to Equ. 1 was tested to take on average 22.35 ms of computing cost, which is a saving of processing cost of about 65%. Applying a plurality of function calls 107 according to an input sequence 106 adaptively optimized according to Equ. 2, the overall-processing cost was tested to take on average 21.87 ms of computing cost. This is near to the savings of optimization strategy 1. Nevertheless, applying an input sequence 106 adaptively optimized according to Equ. 2, but removing all function calls 107 with an abort probability P(ok)=1, while determining the updated input sequence and appending the removed function calls 107 at the end of the updated input sequence, results in an average of 12.33 ms of overall computing cost. Hence, this optimization strategy results in a processing cost saving of about 81%.

Furthermore, some embodiments apply the method continuously taking into consideration updated measurements 301, 302 of computing cost and abort probability in order to optimize the input sequence 106 on the basis of a combined processing time. This enables an adaptive optimization of the input sequence 106. Hence, the optimization is also able to adapt to an evolving data processing system 100 over time. Moreover, it may be applied on different stages when processing a request 103 having synergetic impact on the overall computing cost of processing the cost as shown in the following.

In example embodiments, where all permutations of function calls 107 in an input sequence 106 are processed according to a tree structure 400 as shown for example in FIG. 4, FIG. 5 and FIG. 6 the processing cost for adaptively determining the optimal ordering of the function calls 107 in the input sequence 106 is performed by tree search algorithms. The approaches shown above use an exhaustive search by computing all possible permutations, determining a sequence processing cost 305 for all of the permutations and selecting the most optimal permutation according to the optimization aim, viz. minimal processing cost. This approach determines the global minimum of sequence processing cost amongst all possibilities of permutations. However, the number of permutations grows faster than exponential depending on the number of function calls 107 in the input sequence 106. Hence, instead of applying such a brute-force approach, the processing cost for the optimization itself is optimized by applying less cost-intensive search algorithms which may, even though not determining the global optimum, find a local optimum of sequence processing cost in the tree structure 400 at a significantly lower processing cost for the optimization itself.

For example, in some embodiments, a random search is performed, randomly computing a fixed number of permutations of function calls 107 in the input sequence 106 on the assumption of correlated abort probabilities of function calls 107 according to Equ. 2. The dependent success probabilities $P(Ok_{n-1} \cap \ldots Ok_2 \cap Ok_1)$ 502 in FIG. 5 steadily gets smaller with increasing number of predecessor function calls 107 in the sequence. Hence, the highest impact on the sequence processing cost of a permutation is given by the nodes in the tree structure 400 which are near to the root R, viz. are in the ordering of the permutation at the beginning. Therewith, although the random search only finds a local optimum within all permutations of function calls 107 this local optimum often is close to the global optimum because of the special characteristics of the dependent abort probabilities described above. Since, only a fixed number of permutations of function calls 107 is computed, the computing cost for finding a (semi) optimal ordering of function calls 107 is also fixed, instead of more than exponential in the number of function calls 107 in an exhaustive search approach.

In another example, a greedy search algorithm is performed in order to find a global optimum. Such a greedy algorithm on a tree structure 400 may be the known Dijkstra algorithm. Starting from the root R in FIG. 4 or FIG. 5 the Dijkstra algorithm iteratively inspects immediate child nodes, computing the processing cost for each of these child nodes and choosing the one with lowest processing cost. From this chosen child node, the algorithm inspects the next immediate child nodes and so forth until a leaf of the tree is found or the processing of the sequence is aborted. Since according to the Equ. 1 and Equ. 2 the abort probability and the computing cost is considered, when processing the respective processing cost of each node, viz. each function call 107 according to the input sequence 106, the optimization accounts for a minimal processing cost. The advantage of applying the Dijkstra algorithm is that not all permutation costs are computed and moreover intermediary computed values are reused, additionally saving processing cost for the optimization itself.

Optionally, some embodiments combine both approaches to benefit from a fixed number of permutations in order to keep the processing cost for determining an optimal permutation of function calls 107 also fixed and additionally benefit from the characteristics of a greedy algorithm to find a global optimum by always choosing the child node with the cheapest processing cost. In such a combination, the amount of processing time and the optimality of the resulting order of function calls 107 is determined by the number of allowed computation steps, whereby the optimization strives towards the global optimum with increasing numbers of computations. Such an algorithm is, for example, given by a Monte-Carlo Tree Search algorithm, whereby the processing cost is further reduced in each computation step by performing a guided exploration of permutation paths according to an exploration policy and successively pruning the tree structure 400.

In some embodiments, the rearrangement order is determined on the input sequence 106 of function calls 107 by a Monte-Carlo-Tree Search with exploration policy.

Starting from a root R in the tree structure 400 of FIG. 4 or FIG. 5, a subsequent child node is selected (selecting stage of known Monte-Carlo Tree search (MCTS)) according to an exploration policy depending on the number of explorations of the respective child node. From the chosen child-node, a random permutation of all subsequent child nodes is selected having the chosen child node as parent node (expansion and simulation stage of MCTS). The processing cost of the chosen permutation is determined (playout of MCTS) and the result is used to updated the nodes of the selected permutation from the tail back to the root. Hence, in each iteration a result for a permutation is determined to weight the nodes in the tree structure 400. In this way, the better nodes, viz. nodes representing function calls 107 with low processing cost, are more likely to be selected in further iterations of the MCTS. Hence, in each iteration the weighting of better nodes is improved and approaches an optimum. Hence, the relation between the processing time for finding a permutation of function calls 107 and the optimality of the determined order of function calls 107 in the permutation is controlled and may be applied as suitable.

The exploration policy balances the selection of permutations. It takes the number of visits during the iterations of MCTS into consideration to prune dynamically the tree structure in order to always explore the most interesting permutations and reduce the tree by pruning less interesting branches. A value V, determined for a node i by an exploration policy is for example given by $$V_i = E(C_{node\ i}) - \gamma\sqrt{\frac{\ln(n_{parent})}{n_i}}$$

where $n_{parent}$ is the total number of choosing the node in a permutation over all iterations of MCTS, γ is an exploration parameter included in the MCTS which is theoretically set to √2 but is in practice usually chosen empirically. $E(C_{node\ i})$ is given by:

$$E(C_{node\ i}) = \frac{1}{n_i} \cdot \sum_{k=1}^{n_i} E(C_{children\ of\ i})$$

wherein $n_i$ is the number of explorations of the $i^{th}$ node.

Applying the MCTS with an exploration policy contributes to an optimization of the input sequence 106 allowing for controlling the balance between the quality of the optimization from a semi-optimal local minimum of processing cost to an optimal global minimum of processing cost and the potentially cost-intensive processing cost for the optimization itself. By the exploration policy, the processing cost for the optimization itself is additionally reduced by dynamically pruning the tree structure to explore the most interesting permutations, viz. orderings of function calls 107 which abort fast with low processing cost. Additionally, the application of the MCTS allows for an effective parallelization, e.g. computing different random permutations on different processors 102 simultaneously.

In some example embodiments a threshold assessing the computation complexity of the MCTS or other optimization strategies determines whether the computation of an optimized ordering of function calls 107 in the input sequence 106, better is switched to another computation strategy, e.g. computation of all permutations as exemplarily shown in FIG. 4. Such a threshold may be a function determining the number of validity checks, performed by the input sequence 106 of function calls 107, a value for the correlation of function calls 107 in an input sequence 106, a distance cost or other suitable values to decide when it is advantageous to change the optimization strategy.

In some embodiments, the system for processing the sequence of a plurality of function calls 107 is a database system, arranged to process data stored in a database system. A database request 103 is received at the system from a client 104. A set of output results 105 on the basis of the received database request 103 is computed. A plurality of function calls 107 is applied to the output results, processing the plurality of function calls 107 according to the input sequence 106 on each output result. Each function call of the plurality of function calls 107 invalidates 106 the intermediate result according to the abort probability of the function call and utilizes the processing cost of the function call. The processing of the plurality function calls 107 according to the input sequence 106 is aborted, when the function call invalidates the output result. The output result, invalidated by the function call is not included in the set of final output results 105 to be returned to the client 104. Hence, the computed set of final output results 105 on the basis of the received database request 103 is potentially reduced to the set of final output results 105. The set of final output results 105 is returned to the client 104.

Applying a plurality of function calls 107 in accordance to an adaptively optimized input sequence 106 to invalidate data to reduce a set of output results to a final set of output results 105 to be returned to the client 104 optimizes this last step of the data processing. As pointed out before, the reduction concerns up to billions of potential output results to be reduced to a final set of final output results 105 including a number of output results 105 in a one- or two-digit range. This is performed by the methodologies herein in more efficient way, than invalidating the large amount of output results by e.g. a configured but fixed sequence of function calls 107. Where also loaded data and intermediate results are invalidated by a plurality of function calls 107 according to an input sequence 106 in an adaptively optimized ordering, the processing cost and even storage resources utilized by the whole processing of the request 103 is optimized. The plurality of function calls 107 processed according to the input sequence 106 is applied when the data records are loaded from the tables of the database system, while creating the set of intermediate results from the loaded data records and/or when output results are invalidated that are not applicable. As a consequence, on the one hand, this reduces storage resources since significantly fewer intermediate results are included in the set of intermediate results and output results to be further processed than are included without an invalidation. On the other hand, this reduces reduction and selection operations on the set of intermediate results and therewith additionally saving significantly processing resources for further processing.

Figure 8:
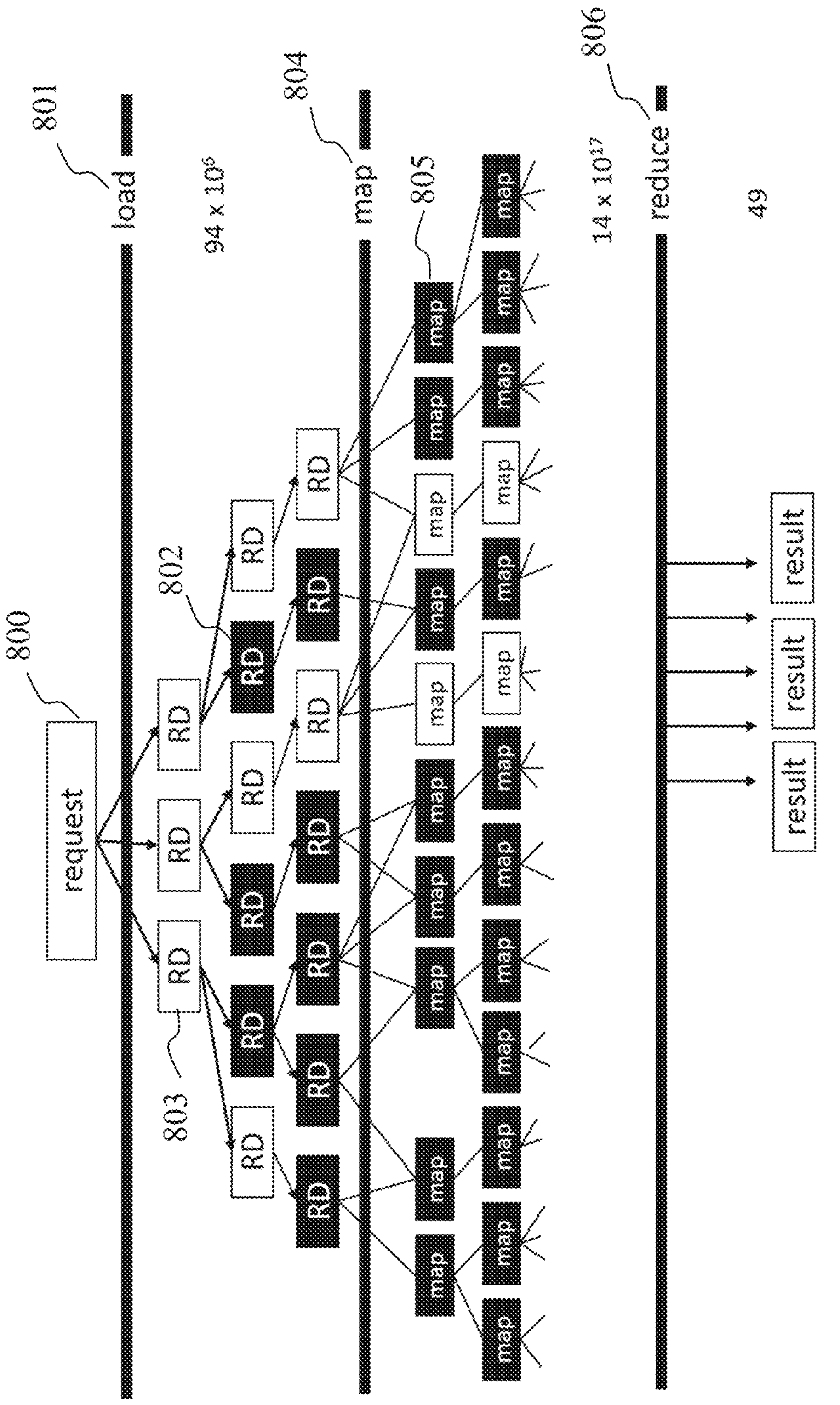
FIG. 8 visualizes the effect of applying an input sequence at different stages of data processing.

As shown in FIG. 8 relating to a database system, a request 103, 800 received by a database system may produce a load 801 of e.g. $94\times10^6$ data records. On the set of loaded data records mapping operations 804, e.g. aggregation, combination, permutation, creates a set of intermediate results. Where no plurality of function calls 107 according to an adaptively optimized input sequence 106 for invalidating data at the stage of loading data 801 or at the stage of creating intermediate results 804 is applied, the set of intermediate results may for example include $14\times10^{17}$ intermediate results. From this set of intermediate results, intermediate results are excluded or further aggregated in order to obtain a set of output results. The set of output results then is further reduced to a set of final output results 105 by invalidating all output results that are not applicable, which in general includes a number of output results 105 in a single- or double-digit range, e.g. 49. Applying a plurality of function calls 107 according to an adaptively optimized input sequence 106 at the stage of data load 801, eliminating invalid loaded data (black nodes, 802) leads to an already reduced set of remaining data records (white nodes, 803) on which intermediate results are created. As a synergetic effect for processing cost, all subsequent computations for creating intermediate results relying on invalidated data records 802 are not performed. The same synergetic effect applies when invalidating output results 805 processed from intermediate results to obtain the set of final output result because the invalidated output results are not applicable. Since in the stage of reducing 806 the set of output results to obtain a set of final output results then only has to apply the plurality of function calls 107 according to the adaptively optimized input sequence 106 to the reduced set of output results.

In some embodiments, the set of intermediate results is at least reduced by processing a plurality of function calls 107 according to an adaptively optimized input sequence 106 to each intermediate result in the set of intermediate results. Each function call of the plurality of function calls 107 invalidates an intermediate result in the set of intermediate results according to the abort probability of the function call and utilizes the processing cost of the function call. The processing of the plurality of function calls 107 according to the input sequence 106 is aborted when the function call invalidates the intermediate result. The intermediate result being invalidated by the function call is eliminated from the set of intermediate results. Intermediate results not invalidated by the plurality of function calls 107 are included in the set of output results.

Independent from applying a plurality of function calls 107 according to an adaptively optimized input sequences 106 at the stages of loading data records 801 and/or mapping data records 804 in order to create intermediate results 804, a plurality of function calls 107 according to an adaptively optimized input sequence 106 is applied at the stage of reducing 806 the set of output results to obtain a set final set of output results 105 to be provided to the client 104. As already pointed out, if no plurality of function calls 107 according to an adaptively optimized input sequence 106 has been applied on previous processing stages 801, 804, this means that about a number of, e.g. $14\times10^{17}$ intermediate results are checked if they are applicable and invalidated in order to obtain a final set of output results 105, which includes in general a number of output results 105 in a single- or double-digit range, e.g. 49 results to be returned to answer the request 103, 800. Hence, optimizing the invalidation of output results at the stage of reduction, significantly benefits from an invalidation by an adaptively optimized input sequence 106 as already shown in FIG. 7. However, applying a plurality of function calls 107 according to an adaptively optimized input sequence 106 at different stages of the data processing 801, 804, 806 has a significant synergetic effect on the processing cost and time, since an invalidation at early stages in the data processing propagates to subsequent processing, because invalidated data is not further considered on the next stage. This is demonstrated in FIG. 8 by the number of all nodes (no invalidation) in correspondence to the white nodes (data/results that are valid) related to the black nodes which are invalidated and therewith none of their children has to be processed in a later stage of the data processing. Hence, this processing corresponds to the optimal processing path 200 shown in FIG. 2.

Hence, the data processing in a data processing system 100 is reduced to a minimum by applying a plurality of function calls 107 according to an adaptively optimized input sequence 106 for invalidating data records, intermediate results and output in the curse of processing at different stages. This significantly enhances processing time and also storage resources by eliminating invalid data records and intermediate results at early stages in the data processing and the processing of useless subsequent processing steps on invalid data records, intermediate results and output results. As mentioned at the beginning, the CPU utilization in the data processing system 100 in view of the whole processing of requests 103 may be reduced by 10% up to 50% depending on the strategies described herein and also on the complexity of the evolving characteristics of data pool.

Figure 9:
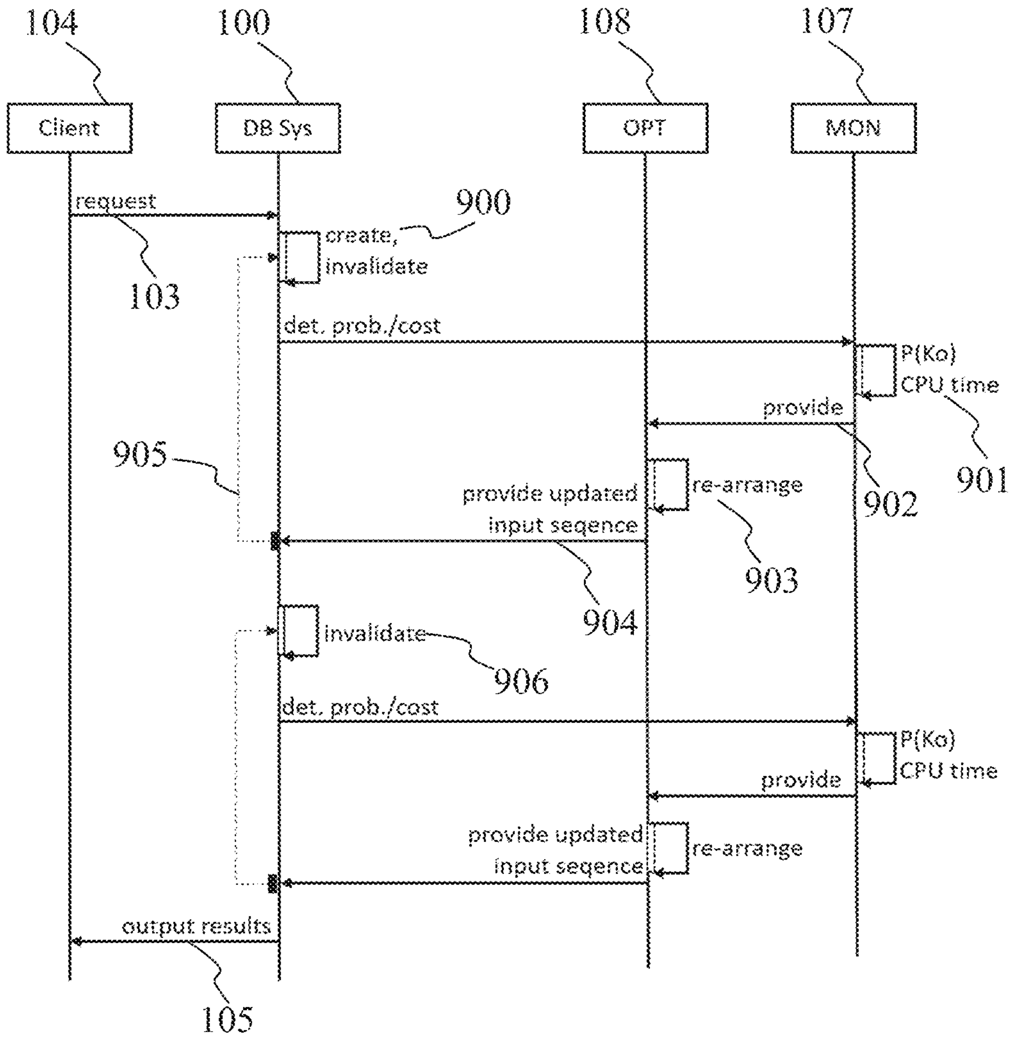
FIG. 9 shows a sequence chart illustrating the application of input sequences.

In summary, the application of pluralities of function calls 107 according to an adaptively optimized input sequence 106 at different stages in the whole processing of requests 103 is demonstrated in FIG. 9. An exemplary data processing system 100 receives a request 103 from a client 104. A set of intermediate results is created 900 including loading data records from the database tables and mapping the data records to intermediate results. A plurality of function calls 107 according to an adaptively optimized input sequence 106 is applied to each of the created intermediate results while creating, in order to invalidate created intermediate results 900 at this stage and not including the created intermediate results in the set of intermediate results for further processing. Hence, the plurality of function calls 107 according to an adaptively optimized input sequence 106 is processed 300 of FIG. 3 as on a currently created intermediate result performing checks on the intermediate result, e.g. proving assignment of variables, computing and evaluating a checksum for the intermediate result, in order to determine, if the intermediate result has to be invalidated by one of the function calls 107 of the plurality of function calls 107 according to an adaptively optimized input sequence 106. For each function call 107 until the abort of the input sequence 106 because of an invalidation or the finalization of processing of all function calls 107 according to the input sequence 106, the abort probability and processing cost are updated 301, 302 according to by the monitor 109 according to one of the strategies described above, e.g. as presented in Equ. 1 and/or Equ. 2. The processing and updates according to 300 to 304 of FIG. 3 are iterated until the processing of the input sequence 106 is aborted by proving the intermediate result to be invalid or until the last function call 107 in the input sequence 106 is processed without invalidating the intermediate result, proving that the intermediate result is valid at this stage of the data processing and is to be included in the set of intermediate results.

The potentially updated abort probabilities and processing cost 901 are provided 902 to the optimizer 108. Alternatively, the monitor 109 provides the abort probability and the computing cost of each function call 107 and the optimizer 108 determines the processing cost for the respective function calls 107 according Equ. 1 or Equ. 2. Further alternatively, the updates of the abort probabilities and processing costs 301, 302 are computed offline and provided by a shadow database system, not aborting the processing of the input sequence 106, where a function call invalidates the intermediate (or on other stages the loaded data record or output result), and therewith updating the abort probabilities and processing costs of all function calls 107 in the input sequence 106. The optimizer 108 determines an optimal ordering of function calls 107 according to one of the methods explained above, e.g. those which are shown in FIG. 4 to FIG. 6 combined with one of the described tree search algorithms and taking a sequence processing cost according to the determination 305 in FIG. 3 into consideration, to find an updated input sequence which minimizes processing cost. The updated input sequence is then provided 904 to the data processing system 100. Hence, for the next processing of the input sequence 106 of function calls 107, e.g. when processing the invalidation of the next created intermediate result, the updated input sequence is processed 900 as new input sequence 905.

The processing according to 900 to 904 is iterated until all intermediate results have been created and proven for their validity resulting in a set of intermediate result or even output results which is already optimized in size by applying the adaptively optimized input sequence 106. Another plurality of function calls 107 according to an adaptively optimized input sequence 106 may be also applied and processed accordingly when loading data records from the tables of the data processing system 100 before creating intermediate results, wherein the function calls 107 prove the invalidity of the loaded data records, already reducing the number intermediate results that are created as also shown in FIG. 8.

In the next stage of processing, another plurality of function calls 107 according to an adaptively optimized input sequence 106 is applied to the set of output results 906 in order to invalidate not applicable output results by invalidation according to the procedure already applied in the processing according to 900 to 905. Finally, the request 103 is answered by providing at least the final output results 105.

Figure 10:
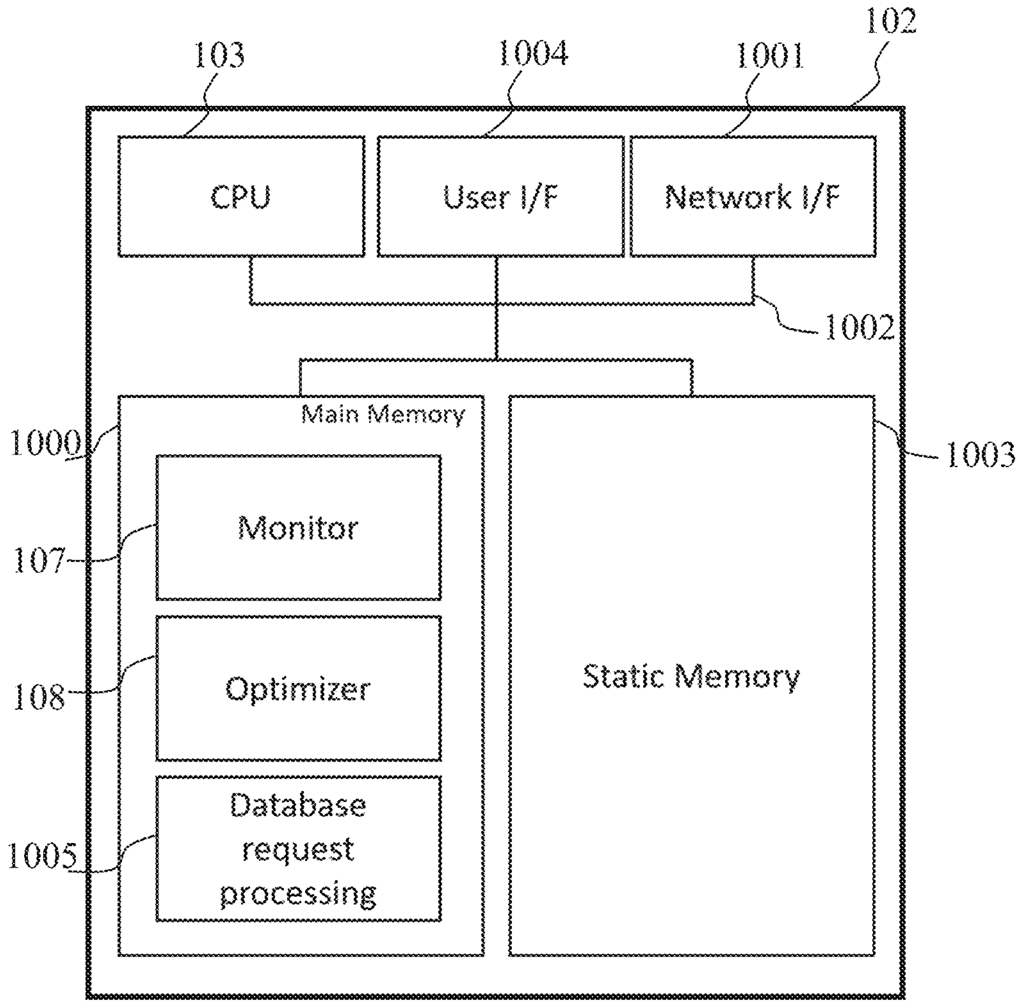
FIG. 10 presents an exemplary schematic view of the architecture of a computing machine.

FIG. 10 is a diagrammatic representation of the internal components of a computing machine 101. The computing machine 101 includes a set of instructions to cause the computing machine 101 to perform any of the methodologies discussed herein when executed by the computing machine 102. The computing machine 101 includes one or more processors 102, a main memory 1000 and a network interface device 1001 which communicate with each other via a bus 1002. Optionally, the computing machine 101 may further include a static memory 1003 and a disk-drive unit. A video display, an alpha-numeric input device and a curser control device may be provided as example of user interface 1004. The network interface device 1001 connects the computing machine 101 at least to clients 104 as well as to the databases of the data processing system 100.

In embodiments, in which the computing machine 101 hosts the monitor 109 and the optimizer 108 may be kept in the main memory 1000. A set of computer-executable instructions (i.e., computer program code) embodying any one, or all of the methodologies described above, resides completely, or at least partially, in or on a machine-readable medium, e.g. the main memory 1000 (shown as functional entities database request processing 1005 including the functionality to receive and process database request 103 including the invalidation of data records and/or intermediate results as well as processing the plurality of function calls 107 processed according to an adaptively optimized input sequence 106 to be processed by the processor 102). The instructions may further be transmitted or received as a propagated signal via the Internet through the network interface device 1001. Basic operation of the computing machine 101 including user interface and network communication is controlled by an operating system which is also located in the main memory 1000, the one or more processors 102 and/or the static memory 1003.

In general, the routines executed to implement the embodiments of the invention, whether implemented as part of an operating system or a specific application, component, pro-gram, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors 102 in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor 102 to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors 102 of a general-purpose computer, a special purpose computer, or other programmable data processing apparatus to produce a machine, such that the instructions, which execute via the one or more processors 102, cause a series of computations to be performed to implement the functions, acts, and/or operations specified in the flow charts and/or sequence diagrams.

While all of the invention has been illustrated by a description of various embodiments and while these embodiments have been described in considerable detail, it is not the intention to restrict or in any way limit the scope of the embodiments described herein. Additional advantages and modifications will readily appear to those skilled in the art. The invention in its broader aspects is therefore not limited to the specific details, representative apparatus and method, and illustrative examples shown and described.

The invention claimed is:

1. A method for processing an input sequence of a plurality of function calls, wherein the function calls of the plurality of function calls are associated with an abort probability, the abort probability of a particular function call indicating a probability that processing the particular function call causes an abort of the processing of the input sequence, and wherein the function calls of the plurality of function calls are associated with a processing cost on the basis of a number of processor instructions of a respective function call and/or the abort probability of the respective function call, wherein the method comprises, at one or more processors:

processing at least a subset of the plurality of function calls according to the input sequence, at least until the particular function call aborts the processing of the input sequence, updating the abort probability for at least the processed subset of the plurality of function calls, based on whether or not the processing of the respective function call caused the abort;

updating the processing cost per function call for at least the subset of the plurality of function calls; and determining an updated input sequence by rearranging the order of the function calls at least on the basis of the processing cost of the function calls.

2. The method of claim 1, wherein a sequence processing cost of a sequence is given by the sum of the processing cost per function call until the abort of the processing of the sequence, and the sequence processing cost of the updated input sequence is lower than the processing cost of the input sequence.

3. The method of claim 1, wherein processing at least the subset of the plurality of function calls according to the input sequence further comprises:

updating the processing cost of a function call independently from an update of the processing cost of previously-processed function calls in the input sequence.

4. The method of claim 1, wherein determining the updated input sequence further comprises:

determining an average expected cost for each permutation of function calls in the input sequence by:

determining a dependent success probability for at least the subset of function calls;

determining for each permutation of function calls a sum of all products of the dependent success probability and the processing cost for at least the subset of function calls;

selecting the permutation with a minimal average expected cost; and rearranging the order of function calls on the basis of the selected permutation.

5. The method of claim 1, further comprising:

removing all function calls having an abort probability of 0 from the input sequence before determining the updated input sequence.

6. The method of claim 1, wherein a rearrangement order is determined by a Monte-Carlo-Tree-Search with exploration policy.

7. A system for processing an input sequence of a plurality of function calls, wherein the function calls of the plurality of function calls are associated with an abort probability, the abort probability of a particular function call indicating a probability that processing the particular function call causes an abort of the processing of the input sequence, and wherein the function calls of the plurality of function calls are associated with a processing cost on the basis of a number of processor instructions of a respective function call and/or the abort probability of the respective function call, wherein the system is, at one or more processors, configured to:

process at least a subset of the plurality of function calls according to the input sequence, at least until the particular function call aborts the processing of the input sequence;

update the abort probability for at least the processed subset of the plurality of function calls, based on whether or not the processing of the respective function call caused the abort;

update the processing cost per function call for at least the subset of the plurality of function calls; and determine an updated input sequence by rearranging the order of the function calls at least on the basis of the processing cost of the function calls.

8. The system of claim 7, wherein a sequence processing cost of a sequence is given by the sum of the processing cost per function call until the abort of the processing of the sequence, and the sequence processing cost of the updated input sequence is lower than the processing cost of the input sequence.

9. The system of claim 7, wherein the processing cost of a function call is updated independently from an update of the processing cost of previously-processed function calls in the input sequence.

10. The system of claim 7, wherein the system is further configured to determine the updated input sequence by:

determining an average expected cost for each permutation of function calls in the input sequence by:

determining a dependent success probability for at least the subset of function calls;

determining, for each permutation of function calls, a sum of all products of the dependent success probability and the processing cost for at least the subset of function calls;

selecting the permutation with a minimal average expected cost; and rearranging the order of function calls on the basis of the selected permutation.

11. The system of claim 10, wherein the system is further configured to remove all function calls having an abort probability of 0 from the input sequence before determining the updated input sequence.

12. The system of claim 10, wherein the system is further configured to determine the updated input sequence by:

rearranging the order of the sequence of function calls by a Monte-Carlo-Tree-Search with exploration policy.

13. The system of claim 7, wherein the system is a database system, and the database system is configured to process data stored in the database system by:

receiving a database request from a client at the system;

computing a set of output results on the basis of the received database request; and returning the set of output results to the client, wherein the plurality of function calls is applied to the computed set of output results, processing the plurality of function calls according to the input sequence on each output result, wherein each function call of the plurality of function calls invalidates the output result according to the abort probability of the function call and utilizes the processing cost of the function call, wherein the processing of the plurality of function calls according to the input sequence is aborted when the function call invalidates the output result, and wherein the output result, being invalidated by the function call, is not included in the set of output results.

14. The system of claim 13, wherein the set of intermediate results is at least reduced by processing a plurality of function calls according to an input sequence to each intermediate result in the set of intermediate results, wherein each function call of the plurality of function calls invalidates an intermediate result in the set of intermediate results according to the abort probability of the function call and utilizes the processing cost of the function call, wherein the processing of the plurality of function calls according to the input sequence is aborted when the function call invalidates the intermediate result, and wherein the intermediate result being invalidated by the function call is eliminated from the set of intermediate results.

15. A computer program product comprising:

a non-transitory computer-readable storage medium; and instructions stored on the non-transitory computer-readable storage medium that, when executed by a processor, cause the processor to process an input sequence of a plurality of function calls on at least one processor, wherein the function calls of the plurality of function calls are associated with an abort probability, the abort probability of a particular function call indicating a probability that processing the particular function call causes an abort of the processing of the input sequence, and wherein the function calls of the plurality of function calls are associated with a processing cost on the basis of a number of processor instructions of a respective function call and/or the abort probability of the respective function call, wherein the instructions comprise:

process at least a subset of the plurality of function calls according to the input sequence, at least until the particular function call aborts the processing of the input sequence;

update the abort probability for at least the processed subset of the plurality of function calls, based on whether or not the processing of the respective function call caused the abort;

update the processing cost per function call for at least the subset of the plurality of function calls; and determine an updated input sequence by rearranging the order of the function calls at least on the basis of the processing cost of the function calls.

16. The method of claim 1 wherein the function calls are requests made by a computer program code and which are applied to data to provide return values, and the abort probability of each particular function call is a statistical measure based on previous iterations of the particular function call.

17. The system of claim 7 wherein the function calls are requests made by a computer program code and which are applied to data to provide return values, and the abort probability of each particular function call is a statistical measure based on previous iterations of the particular function call.

18. The computer program product of claim 15 wherein the function calls are requests made by a computer program code and which are applied to data to provide return values, and the abort probability of each particular function call is a statistical measure based on previous iterations of the particular function call.

* * * * *